Feb. 15, 1949.  C. B. SEEM  2,461,929
DOUGH ROUNDER
Filed Aug. 10, 1944  3 Sheets-Sheet 1
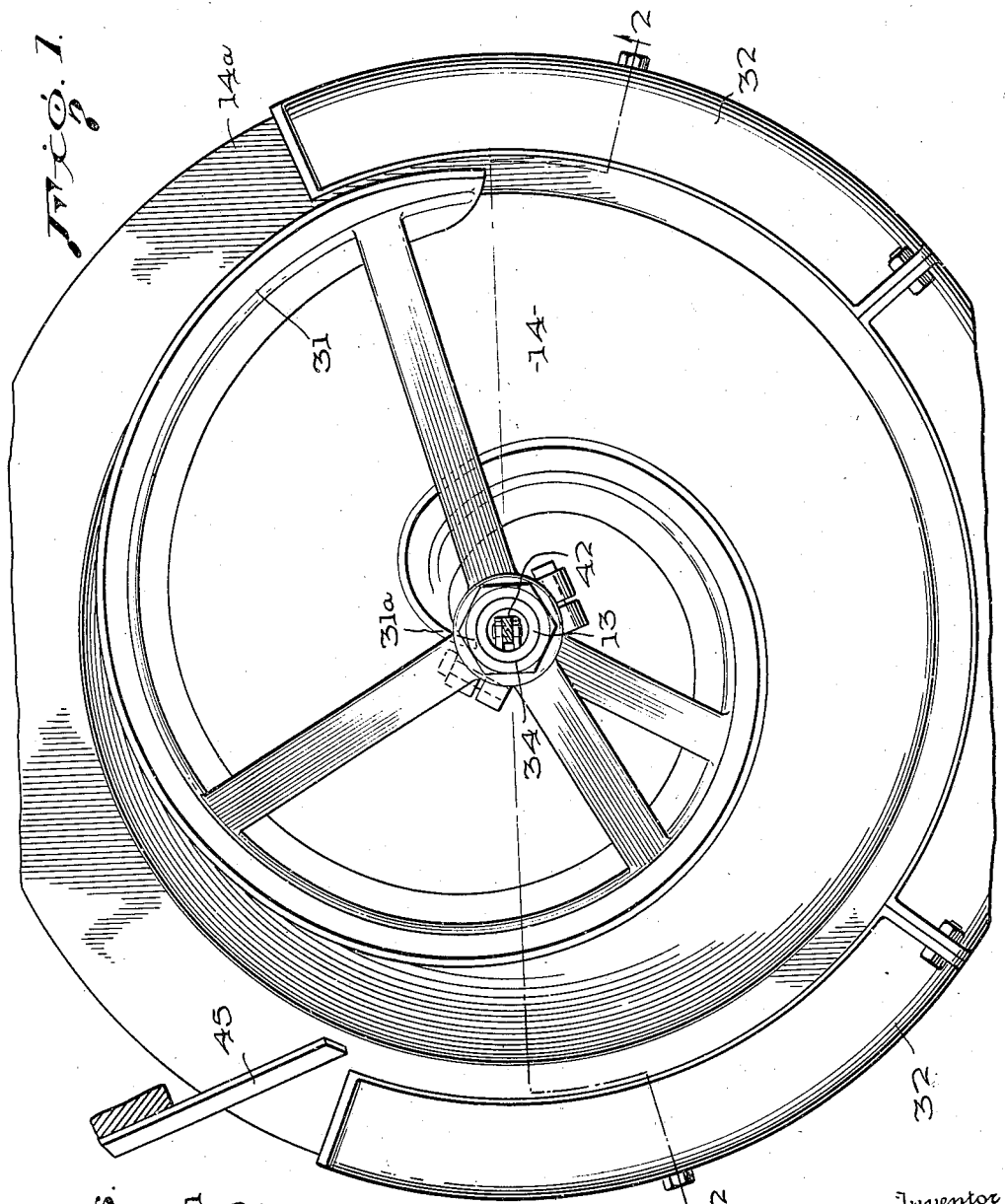
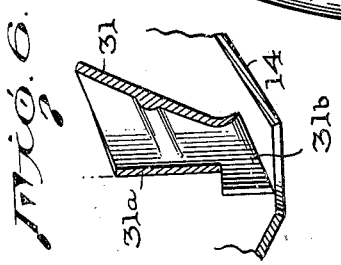
Inventor
CHARLES B. SEEM
By Church & Church
His Attorneys Feb. 15, 1949.  C. B. SEEM  2,461,929
DOUGH ROUNDER
Filed Aug. 10, 1944  3 Sheets-Sheet 2
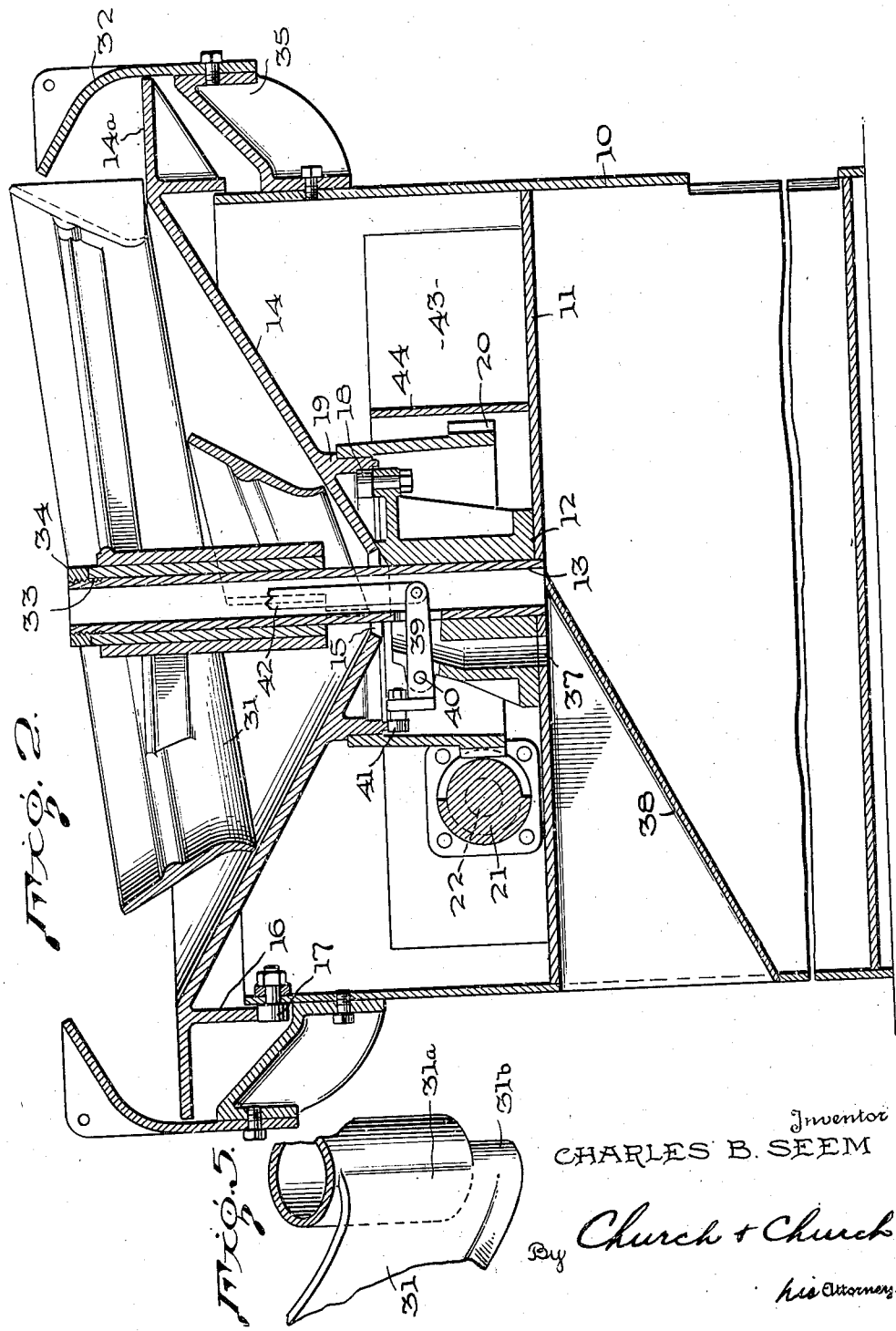
INVENTOR
CHARLES B. SEEM
By Church & Church
his Attorneys Feb. 15, 1949.  C. B. SEEM  2,461,929
DOUGH ROUNDER
Filed Aug. 10, 1944  3 Sheets-Sheet 3

Inventor
CHARLES B. SEEM
By Church & Church
his Attorneys

Patented Feb. 15, 1949

2,461,929

UNITED STATES PATENT OFFICE 2,461,929

DOUGH ROUNDER

Charles B. Seem, Beacon, N. Y., assignor to Dutchess Tool Company, Inc., Beacon, N. Y., a corporation of New York Application August 10, 1944, Serial No. 548,865

6 Claims. (Cl. 107—9)

This invention relates to improvements in dough handling machinery and particularly to a machine for rounding-up lumps of dough for making loaves of bread.

One object of the invention is to provide a rounding-up machine in which the lumps of dough will not be subjected to excessive pressure while being worked or rounded up but, on the contrary, such rounding-up will be accomplished with a gentle kneading and rolling action.

Another object of the invention is to provide a rounder wherein the individual lumps of dough while supported on a continuous, moving surface, are rolled or turned first in one direction and then in the opposite direction by contact with fixed retaining members in order to insure the formation of the desired skin surface over the entire lump.

In the preferred embodiment of the invention the lumps of dough are successively deposited upon the inner surface of a continuously revolving, inverted frusto-conical supporting member near the center of rotation from which point they are advanced in an arcuate path to the periphery of the cone by a curved, auxiliary trough member and a further object of the invention is to provide a simplified arrangement for quickly gathering up each lump as it is deposited on said surface.

A still further object is to provide a rounder of simplified construction which can be readily disassembled and the entire surface over which the dough travels fully exposed to facilitate cleaning said surface.

A further object is to provide a rounder wherein the formation of doubles (two lumps of dough contacting and adhering to each other) is minimized or eliminated.

Another object of the invention is to provide a rounder from which scraps of dough are discharged without interfering with the movement of the normal lumps of dough through the machine.

A further object is to provide a novel and simple, but efficient, mechanism for actuating a dusting device for dusting flour on the lumps of dough that pass through the rounder.

More specifically, the invention contemplates a dough rounder comprising, essentially, two opposed, stationary trough members with an interposed, moving lump supporting member which causes the lumps of dough to travel or roll along the two stationary members successively, each lump rolling or turning in one direction while moving along one of the stationary members and rolling or turning in the opposite direction while traveling along the other member. As previously stated, the intermediate moving supporting member is preferably in the from of an inverted, frusto-conical surface with a spiral-shaped stationary trough member of varying curvature associated with the inner surface to advance the lumps upwardly and outwardly in the direction of the periphery of the conical surface at which point they come into contact with the other stationary trough member which causes the lumps to revolve in a direction opposite to that in which they were turned while confined between the conical surface of the supporting member and the spiral trough member.

With these and other objects in view, the invention consists in certain details of construction and combinations and arrangements of parts, all as will hereinafter be more fully described and the novel features thereof particularly pointed out in the appended claims.

In the accompanying drawings, wherein the preferred embodiment of the invention is illustrated, Figure 1 is a top plan view, partly broken away;

Fig. 2 is a sectional view on the line 2—2 of Fig. 1;

Fig. 5 is a detail view, in perspective, of the extreme inner end portion of the spiral trough member; and Fig. 6 is a detail view, in section, of said inner end portion of said spiral trough member.

Figure 3:
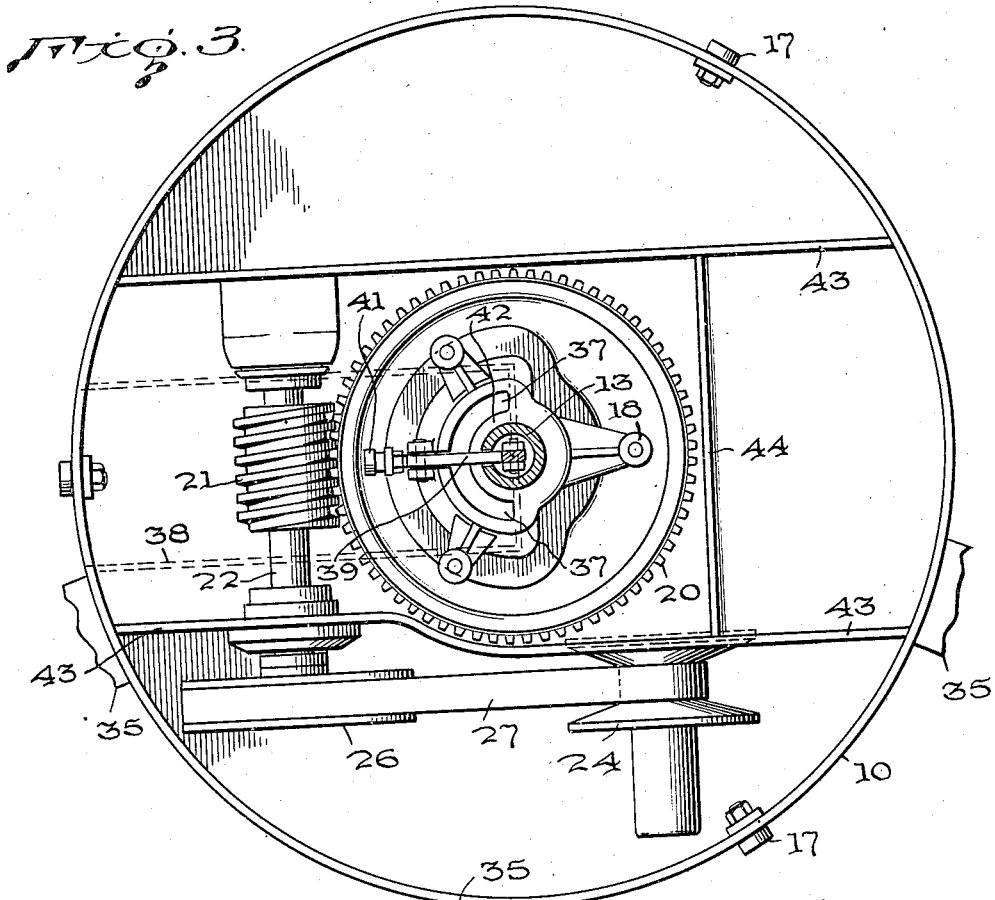
Fig. 3 is a plan view of the base of the machine with the trough members removed.
Figure 4:
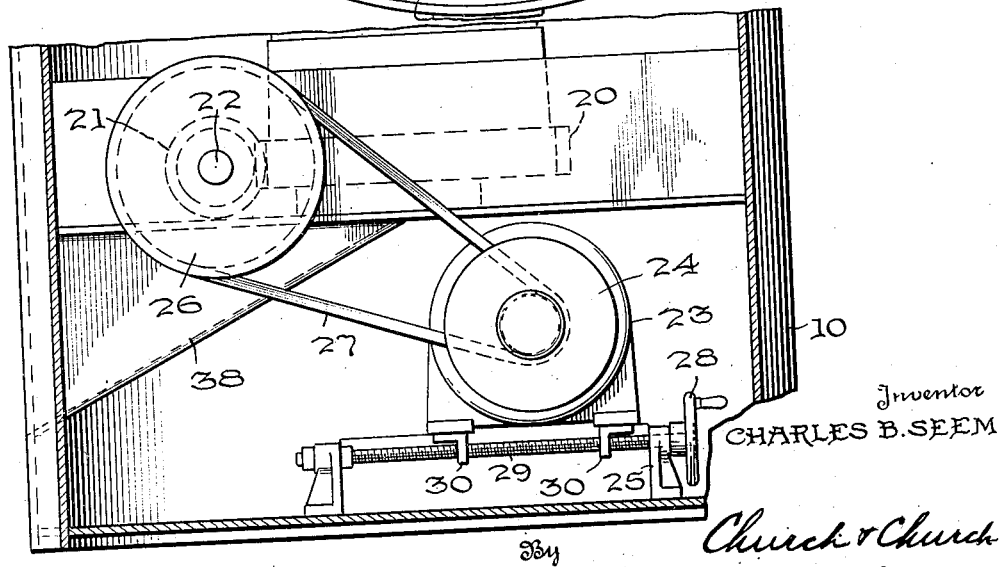
Fig. 4 is an elevational view of the base, illustrating the variable drive connections for the moving trough member.

In the form of the invention illustrated, the machine comprises a cylindrical base 10 having a transverse horizontal partition 11 on which is mounted what, for convenience, will be termed the main mast casting 12 in which, in turn, is mounted the main mast, post or standard 13. The movable, in this instance, rotatable, surface on which the lumps of dough are supported is in the form of an inverted frusto-conical member 14 having a central opening 15, and this supporting member is formed with a peripheral flange 16 supported on roller bearings 17 journaled in base 10, with the mast or standard 13 extending upwardly through the central opening 15. This cone-shaped member 14 is retained in its proper position concentrically with respect to the standard 13 by roller bearings 18 in the main mast casting 12, which engage a depending circular flange 19 on the under surface of said cone member. The conical supporting member may be rotated by any suitable driving connections, but, preferably, these connections comprise a ring gear 20 carried on flange 19 and adapted to be driven by a worm 21 on a shaft 22 which has a variable speed drive connection to motor 23. For instance, motor 23 drives a variable speed drive pulley 24 and is adjustably mounted on a sub-base 25, so that it can be adjusted toward and from a pulley 26 on shaft 22, whereby the rotary motion imparted to said pulley 26 and shaft 22 from pulley 24 by the belt 27 connecting said pulley can be varied at will. A hand wheel 28, on a threaded shaft 29 threaded through projections 30 on the motor base, is provided for making this adjustment of the motor and its drive pulley 24.

This traveling or rotary lump supporting member is adapted to cause the lumps of dough to be rolled first along one kneading or rounding surface and then along a second such surface, in such a manner that each ball will first turn in one direction on its individual axis and, when in contact with the second surface, it will roll or turn in the opposite direction. This preferably accomplished by providing a fixed spiral trough member 31 within the conical member and a second fixed trough member 32 at the periphery of the cone 14, the peripheral portion of said cone having an annular portion 14a which is essentially a continuation of the inner dough supporting surface of the conical member. However, this annular peripheral portion 14a is disposed at an angle to the main portion of the cone 14 and, as shown, is preferably disposed in a horizontal plane. The spiral trough member is adjustably secured on the mast or standard 13, having a sleeve or hub portion 33 threaded on the mast and held in any desired position by a locking nut 34. The outer trough may be bolted to angle clips or brackets 35 mounted on base 10. By having the inner or spiral trough 31 threaded on the mast 13, it can be adjusted relatively to the dough supporting surface of the conical dough supporting member to compensate for wear, and it can also be readily removed, as may also the conical member 14, to permit thorough cleaning of the machine. As will be understood, the trough member 31 causes lumps of dough deposited centrally of the conical member to roll in a path upwardly and outwardly of the conical surface until they reach the upper and outer extremity of said spiral member, at which point they are passed from the conical surface of the cone on to the annular, horizontal extension 14a of said conical surface under the influence of centrifugal force which causes the lumps to engage against the trough member 32. That is, a lump of dough deposited on the cone 14 in the V-shaped trough formed conjointly by the inner surface of the cone and the outer face of the spiral is caused to gradually ascend the cone surface in a spiral path due to the fact that the cone is revolved in a clockwise direction, as viewed in Fig. 1. During this time the weight of the lump of dough is mainly supported by the cone but there is sufficient contact between the lump and the spiral to cause the lump to rotate bodily in a clockwise direction. This functioning continues until the lump comes to the horizontal peripheral portion 14a when it is displaced radially outward against the wall of trough member 32 whereupon the lump itself is caused to rotate in a counterclockwise direction.

Emphasis is placed on the fact that the inner surface of the cone 14 and the peripheral surface portion 14a of the cone constitute the actual dough supporting surface of the present rounder. The trough members 31 and 32 have practically no function so far as supporting the dough is concerned. On the other hand these so-called trough members are essentially rounding-up surfaces against which the lumps of dough are rolled by the revolving cone. This is particularly true of trough member 31 which is inclined in the same general direction as the adjacent portions of the cone surface so that its upper edge is tilted outwardly and located radially outward with respect to its lower edge. In other words, if a line should be drawn vertically through any point along the lower edge of the trough 31, both the trough member and that portion of the cone surface on which the dough is supported against the trough members would be disposed at the same side of such a line or, expressed differently, the cone and trough would be inclined away from that line in the same direction. As a result, the lumps of dough rest on the cone and rub adjacent the trough whereby the lumps are rounded up with a gentle kneading and rolling action as distinguished from the gouging, punishing action that obtains in a machine where the cone and trough are disposed in opposite directions with respect to a line extending vertically through a point at the bottom edge of the trough. For this reason, and as a result of actual tests, it has been found that the best results are obtained if the inclination of the cone surface with respect to the horizontal does not exceed 30° in order that the cone will serve primarily as a supporting surface for the lumps of dough.

As hereinafter pointed out, the centrifugal force exerted by the revolving cone on the lumps of dough tends to urge the lumps away from the kneading surface of the trough 31 and this factor, combined with the factor of having the trough surface and cone surface both inclined in the same general direction aids materially in minimizing the punishment of the lumps while being rounded up and kneaded. It is also the centrifugal force that urges the lumps of dough on the flat portion 14a of the conical member against the trough 32 so they will roll along that member until they reach the deflector 45 by which they are discharged from the machine.

This arrangement has numerous advantages. The important feature is the fact that the dough is subjected to minimum punishment or pressure while being propelled from the point at which it is deposited in the machine to the point where it is discharged. The inclination of the conical surface can be such that the up-hill travel of the dough is minimized, thus reducing the pressure to which the lumps are subjected. It will also be appreciated that, in the construction of the inner trough member 31, the spiral can be developed on a horizontal plane or at any angle to the horizontal, approaching the vertical, depending upon the inclination or disposition of the dough supporting surface of the traveling trough member. Further advantages of a rotary traveling dough supporting member are, first, the centrifugal force developed in the operation thereof tends to throw the lumps of dough away from the kneading surface of the inner trough member, thereby reducing the punishment imposed on the dough and, second, the differential in surface speeds at successive points radially of the rotary member causes successive lumps of dough to become spaced farther apart as they move outwardly of said surface, thus eliminating the possibility of "doubles" forming, which, as previously explained, is the adhering of two successive lumps. This action of the centrifugal force tending to throw the lumps of dough away from the kneading surface of member 31 does not detract from the kneading action in that a fine lapping or skin surface is produced on the dough. The provision of the variable drive mechanism and speed reduction, combined with the angles of dough trough travel that are possible, makes it possible to readily accommodate various types of dough and still obtain efficient rounding action.

In order to quickly gather up each lump of dough when it is deposited on the surface of cone 14 adjacent the inner end of trough 31, the curvature and angular disposition of this portion of the trough is accentuated. Referring to Figs. 1, 2, 5 and 6, it will be seen that the inner extremity of the trough is substantially perpendicular to the horizontal, as indicated at 31a and is formed with perpendicularly disposed extension 31b which actually extends beneath the sleeve 33 on which the trough member is mounted. The curvature of the inner portion of the trough is also formed on a radius much shorter than the remainder of the trough, the curvature gradually increasing toward the periphery of the cone. At the same time, the angularity of the trough also changes with the angle between the cone and trough surfaces gradually decreasing. This abrupt rise of the inner end of the trough causes the lumps to be picked up and quickly removed from the point at which they are deposited on the conical supporting surface and at the same time gathers the lump up into substantially ball shape, thus eliminating the need of providing a preliminary balling or rounding-up mechanism.

It will be noted that the trough member 32 extends only partially around the extension 14a of cone member 14 and that it is composed of a number of segmental sections, preferably two, so as to permit ready adjustment for varying sizes of lumps. Usually, each segment of this trough is attached to two of the clips or brackets 35 and said clips are so spaced circumferentially of the cone as to permit the segments to be attached in any of six different positions around the cone, whereby the take-off or discharge of the lumps of dough from the outer flat supporting surface 14a can be arranged for at different points around the cone. This lends elasticity to the machine for line assemblies in bakeries.

As previously pointed out, the lumps of dough will turn on their individual axes while rolling along the first or inner trough member 31 and will roll or turn on their axes in the opposite direction while traveling along the second or outer trough member 32. This not only produces a fine kneading action, but such action, in its final stages, serves to tuck or fold in the otherwise pear-shaped ends of the rounded lump.

Referring particularly to Figs. 2 and 3, it will be observed that the main mast casting 12 has an opening or passage 37, preferably of arcuate contour, therein in registry with the central opening 15 of the cone or rotary dough supporting surface 14. This opening or passage 37 discharges into a chute 38 within the machine base in which scraps of dough are received as they pass by gravity down through the opening 15 and passage 37.

As also illustrated in Fig. 2, means may also be provided for actuating a dusting mechanism (not shown) for dusting flour on lumps of dough on the surface of cone 14. This actuating mechanism comprises a lever 39 pivoted at 40, with one end projecting into the mast or standard 13, which is tubular, and with its other or outer end provided with a cam roller 41 positioned against a camming surface on flange 19. Preferably, the lower edge of flange 19 is of undulatory configuration and serves as the camming surface. As the dusting mechanism, per se, forms no part of the present invention, illustration or description thereof is unnecessary, but, as will be readily understood by those skilled in the art, by connecting a rod 42 to the inner end of lever 39 and to the vibratory or shaking element of such a dusting mechanism located above the cone member 14, a simple and effective means are provided for dusting flour on dough on said member 14. Of course, this entire flour-dusting mechanism may be dispensed with, if desired.

The vertical parallel partitions 43 and the vertical connecting partition 44, above the platform or partition 11 through the central portion of the machine base constitute a rigid stiffener for the mast support and may also serve as a reservoir for lubricant and a housing for gear reduction when the latter is used in the machine.

What I claim is:

1. A flour duster actuating mechanism for dough rounding machines wherein lumps of dough are supported on an inverted cone rotatable about a base supported, tubualr standard, said mechanism comprising a lever pivotally mounted in said base and extending into said tubular standard, means operable by the revolving cone for rocking said lever, and a connecting rod attached to said lever within said standard for actuating said duster.

2. A flour duster actuating mechanism for dough rounding machines wherein lumps of dough are supported on an inverted cone rotatable about a base supported, tubular standard, said mechanism comprising a lever pivotally mounted in said base and extending into said tubular standard, a cam roller on the outer end of said lever, an undulating cam surface on said cone against which said roller engages to rock said lever, and a connecting rod attached to said lever within said standard.

3. In a dough rounding machine, a base, an inverted conical member rotatable on said base, a spiral trough member mounted in fixed position adjacent the inner surface of the cone and forming in conjunction with the cone a spiral trough for advancing successive lumps of dough upwardly and outwardly of said surface, said lumps being discharged from the inner surface of the cone at the upper, outer edge thereof and said cone having an opening located centrally thereof to which scraps of dough are directed by gravity from the inner surface of said cone, and an inclined chute within said base having its upper end in registry with the opening in the cone.

4. In a dough rounding machine, an inverted conical member with the inner surface of said cone constituting a dough supporting surface inclined with respect to the horizontal, a spiral member mounted in fixed position adjacent the supporting surface of said cone and forming in conjunction with said supporting surface a trough in which lumps of dough are adapted to be confined, said spiral member having a dough engaging surface inclined throughout its length in the same direction but at an angle to the dough supporting surface of the conical member, a second trough member disposed around the periphery of said conical member, the lumps of dough being movable from the trough formed between the conical member and the spiral member to the space between said conical member and the second trough member, and means for rotating said conical member relatively to said spiral member and second trough member.

5. In a dough rounding machine, a rotatable, inverted conical member, the inner surface of said cone forming an inclined dough supporting surface, a spiral member mounted in fixed position adjacent the dough supporting surface of the cone, the dough supporting surface of the cone and the opposed surface of the spiral member forming a trough for the reception of lumps of dough, the said opposed surface of the spiral member being inclined throughout its length in the same direction as the dough supporting surface of the cone and a second arcuate surface forming a trough at the periphery of the conical member, the lumps of dough being movable from a position in the trough between the cone and spiral member to a position against the arcuate surface at the periphery of the cone.

6. In a dough rounding machine, a rotary, inverted conical member, the inner surface of said cone constituting a dough supporting surface, and a stationary spiral kneading member mounted in fixed position adjacent said dough supporting surface and forming in conjunction with said surface a trough for the reception of lumps of dough, said stationary spiral kneading member having an inclined surface against which lumps of dough supported in the trough by said conical member engage, said inclined surface of said spiral kneading member being inclined throughout its length in the same direction as the dough supporting surface of the cone.

CHARLES B. SEEM.

REFERENCES CITED

The following references are of record in the file of this patent:

UNITED STATES PATENTS

| Number | Name | Date |
|---|---|---|
| 854,308 | Petri | May 21, 1907 |
| 1,661,775 | Streich | Mar. 6, 1928 |
| 1,817,643 | Petri | Aug. 4, 1931 |
| 1,970,336 | Pointon et al. | Aug. 14, 1934 |
| 2,165,495 | Marasso | July 11, 1939 |